(No Model.)
G. O. CROMWELL & H. E. COY.
PROCESS OF AND APPARATUS FOR RECLAIMING OIL PREVIOUSLY USED IN MECHANICAL OPERATIONS.
No. 322,425. Patented July 21, 1885.
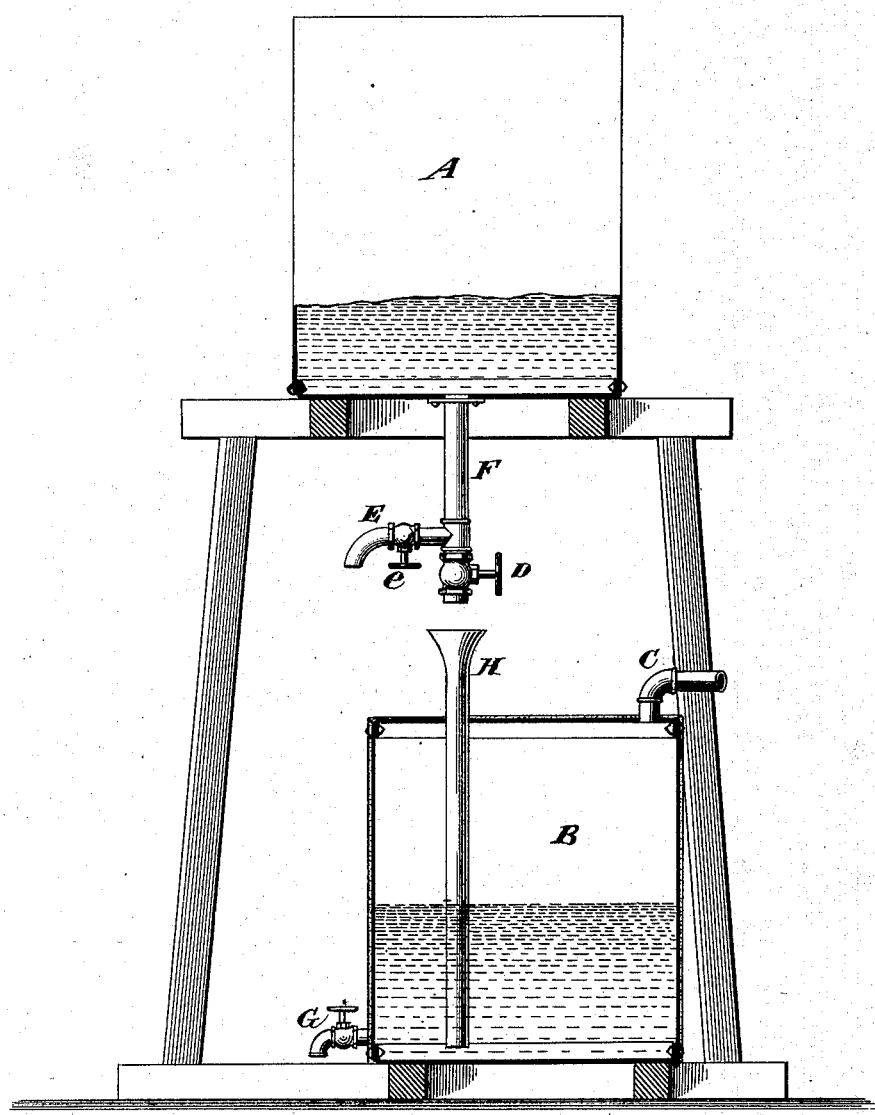
Witnesses:
A. Ruppert,
E. Cruse
Inventors:
George O. Cromwell,
Henry E. Coy,

UNITED STATES PATENT OFFICE.

GEORGE O. CROMWELL AND HENRY E. COY, OF TOLEDO, OHIO.

PROCESS OF AND APPARATUS FOR RECLAIMING OIL PREVIOUSLY USED IN MECHANICAL OPERATIONS.

SPECIFICATION forming part of Letters Patent No. 322,425, dated July 21, 1885.

Application filed November 7, 1884. (No model.)

*To all whom it may concern:*

Be it known that we, GEORGE O. CROMWELL and HENRY E. COY, both of Toledo, in the county of Lucas and State of Ohio, have invented a new and useful Process of and Apparatus for Reclaiming Oil previously used in Mechanical Operations, of which the following is a specification.

The invention relates to means by which oil which has been used in the manufacture of metallic articles may be separated from refuse or waste matter and rendered fit for use again.

It is well known that in the manufacture of many metallic articles much oil is used directly upon the article in course of manufacture—as, for instance, in the manufacture of bolts and nuts. In order to render the articles fit for the market, it is necessary to cleanse them of the oil, particles of metal, &c., which adhere to them. This is usually accomplished by placing the articles in vats, where they are steamed or washed until they are clean and ready for the market. Heretofore the refuse matter remaining after the metallic articles have been removed from the vats has been thrown away; but by our process we are enabled to separate the oil from the refuse matter, which consists, principally, of water, soap, or alkali, and fine particles of metal, and thereby effect a great saving of oil.

In order to carry out our process we use, by preference, an apparatus such as is shown in the accompanying drawing, which is a vertical section.

A is a tank elevated above a second tank, B. At the bottom of the tank A is a discharge-pipe, F, so arranged as to be directly over a tube, H, which is inserted in the tank B, and extends nearly to the bottom thereof. The pipe F is provided with a cock, D, and is also provided with a branch pipe, E, which leads out from the pipe F just above the cock D, and which is furnished with a cock, e.

After the refuse matter has been taken from the vats it is placed in the tank A. We then pour into the tank A sulphuric acid, pure or diluted, which has been diluted by adding to it about an equal quantity of water. The result is that the oil separates from and rises to the top of the refuse matter, and the water, alkali, and most of the metallic particles settle to the bottom of the tank, the alkali and acid uniting. Any other acid or material that accomplishes the same result may be used instead of sulphuric acid. We then open the cock e of the branch pipe E, and the water, alkali, &c., are drawn off first, they being at the bottom. As soon as the oil begins to flow we close the cock e and open the cock D, which allows the oil to run into the tube H, and thence into the tank B. After the oil has been all drawn out of the tank A we pour water into the tank B through the tube H. As the water continues to flow into the tank B the oil, rising to the top of the water, will be gradually forced to the top of the tank B, and the particles of metal still remaining in the oil will sink to the bottom of the tank, the oil flowing perfectly clear from the outlet C at the top of the tank B. The outlet C is of course somewhat lower than the top of the tube H. After all the oil is thus taken from the tank B the water, &c., is drawn off from the tank by means of the stop-cock G.

It is necessary to keep the lower tank, B, warm. This we accomplish by inclosing it in felt, &c.

Having described our invention, we claim—

1. The within-described process of reclaiming oil previously used in mechanical operations, which consists in separating the oil from the alkali, water, and other refuse by mixing with the oil and refuse an acid, either pure or diluted with water, substantially as set forth.

2. The within-described process of reclaiming oil previously used in mechanical operations, which consists in separating the oil from the alkali and water and from the greater part of the metallic particles by mixing with the oil, alkali, metallic particles, and other refuse an acid, either diluted with water or pure, and thereafter further separating the oil from the remaining metallic particles by lifting the oil upon a body of water above said particles, substantially as set forth.

3. In an apparatus for reclaiming oil previously used in mechanical operations, the upper tank, A, having the pipe F, cock D, branch E, and cock e, combined with the lower tank, B, having the tube H, outlet C, and cock G, substantially as set forth.

In testimony whereof we have hereunto set our hands.

GEORGE O. CROMWELL.
    HENRY E. COY.

Witnesses:
 MATT. H. CRAWFORD,
 H. H. BARBER.